Dec. 22, 1942.　　　　L. L. CUSTER　　　　2,306,042
MOTOR VEHICLE
Filed April 29, 1939　　　　2 Sheets-Sheet 1

Inventor
Levitt L. Custer
By Henry G. Dyking
Attorney

Dec. 22, 1942.  L. L. CUSTER  2,306,042
MOTOR VEHICLE
Filed April 29, 1939  2 Sheets-Sheet 2
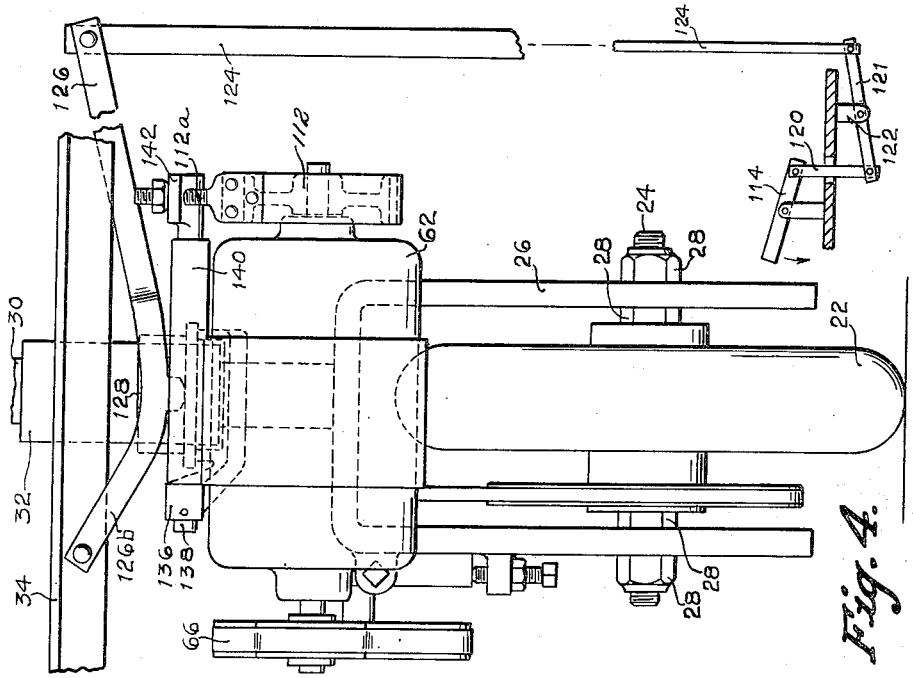
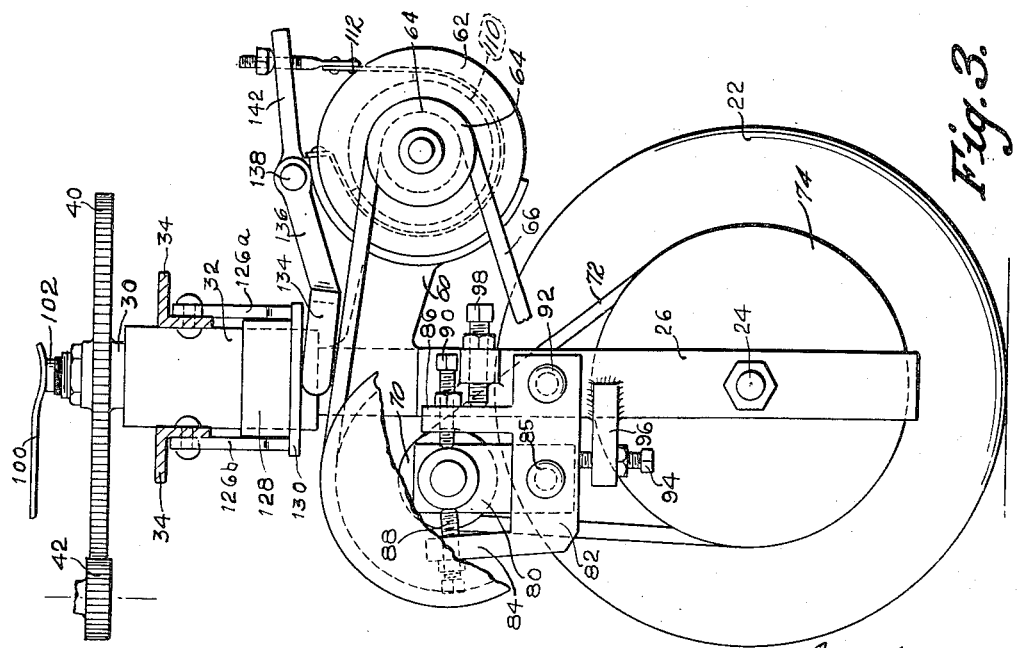

Patented Dec. 22, 1942

2,306,042

UNITED STATES PATENT OFFICE 2,306,042

MOTOR VEHICLE

Levitt L. Custer, Dayton, Ohio

Application April 29, 1939, Serial No. 270,794

4 Claims. (Cl. 180—26)

This invention relates to motor vehicles and more particularly to motor vehicles of the three wheel type wherein the rear wheel is used for propelling the vehicle.

An object of this invention is to provide a motor vehicle that may be easily constructed, that is economical to operate, that is dependable, that is safe and at the same time comfortable, pleasing in appearance and easily controlled under adverse conditions.

Another object of this invention is to provide a brake mechanism for the motor vehicle, utilizing a speed reducing device between the brake and the braking surface.

Another object of this invention is to provide a controller that releases the brakes when the driving mechanism is connected and releases the driving mechanism when the brakes are applied.

Another object of this invention is to provide a motor vehicle having the driver's position located to the rear of the passengers.

Another object of this invention is to provide control mechanism that is located exclusively to the rear of the passengers.

Another object of this invention is to provide a brake mechanism for arresting the movement of the prime mover.

Another object of this invention is to provide a single rear wheel drive, steering and brake wheel for a motor vehicle.

Another object of this invention is to provide a steering wheel that also functions as a brake wheel for a motor vehicle.

Another object of this invention is to provide an effective brake device for a three wheel motor vehicle wherein the brake device in addition to arresting linear movements also arrests rotary movement of the motor vehicle.

Another object of this invention is to provide a brake that is applied through speed reducing mechanism.

Another object of this invention is to provide a three wheel motor vehicle with the pilot seat located to the rear of the passenger seats.

Other objects and advantages reside in the construction of parts, the combination thereof and the mode of operation, as will become more apparent from the following description.

In the drawings, Figure 1 is a top plan view of the motor vehicle.

Figure 3 is an enlarged details view of the driving mechanism as viewed from the side.

Figure 4 is another view of the driving mechanism as viewed from the rear.

Figure 1:
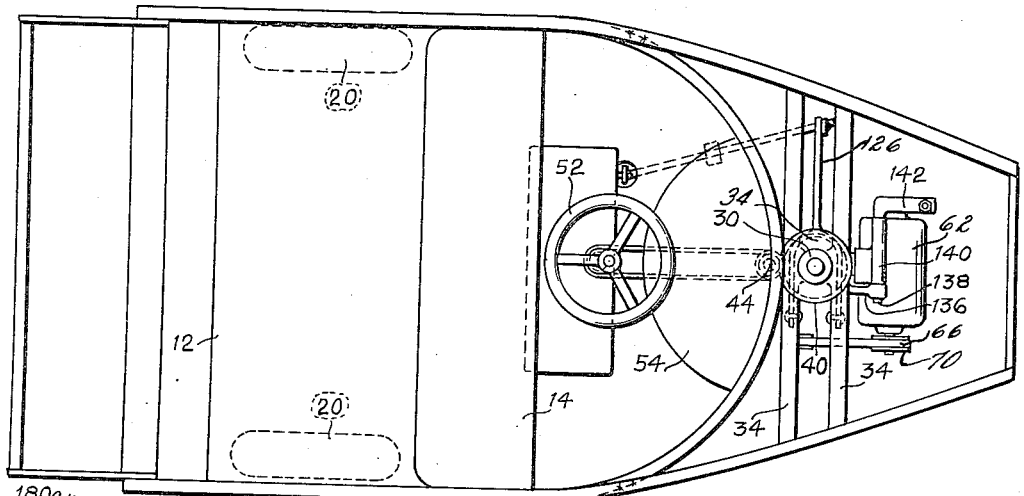

In the past three wheel motor vehicles have been used wherein the third wheel functions as a drive wheel and as a steering wheel, either as a front wheel drive or as a rear wheel drive. In this type of drive, it has been common practice to utilize the two idle wheels as the brake wheels. The brakes are applied to the pair of wheels, which happens to be a very convenient arrangement from a structural standpoint; but this arrangement results in very ineffective brakes, especially for preventing rotation or spinning of the vehicle. In other words, when all three wheels are directed in one direction, the two wheel brakes are very effective; but when the motor vehicle is turning, the two wheel brakes are not very effective, due to the fact that when a third wheel drive is used, the driving mechanism associated with the third wheel, and usually carried thereby, is comparatively heavy, so that the inertia of this mass tends to spin the two wheels about a pivot located between these wheels when the vehicle is making a sharp turn, that is, this mass results in a lateral torque being applied to the motor vehicle by this mass concentrated above the third wheel.

In the present embodiment, this has been overcome by utilizing the drive wheel and the steering wheel as the brake wheel. The brakes then are applied directly below the mass supported by the third wheel and the drive wheel. When this third wheel is used as a brake wheel it results in very effective brakes being applied to the motor vehicle, in that these brakes, in addition to stopping the linear movement, are also very effective in arresting rotary or spinning movement of the motor vehicle, in that the brakes are applied at the greatest distance from the usual vertical axis of rotation.

As referred to above, the brake mechanism is applied so as to arrest the normal linear movement of the motor vehicle when it is proceeding along a straight line and in addition thereto, arrest the lateral torque movement at the source of origin, which torque movement is normally utilized to change the course of the motor vehicle from its linear movement. By applying the brake directly to the armature shaft of the motor, the application of this brake not only tends to stop or arrest the movement of a wheel; but in addition thereto, simultaneously arrests the movement or the rotation of the prime mover.

This is very desirable, especially where the third wheel is used both as a steering wheel and as a drive wheel, in that considerable mass is centered directly above the drive wheel. The weight of the motor, the weight of the cradle supporting the drive wheel or the weight of the shaft and bearings, or whatever the device used for supporting the third wheel, is concentrated in this zone. That being the case, if a two wheel brake were used on the idle wheels, this mass concentrated above the drive wheel would exert tortional stresses in the body of the motor vehicle in the absence of a brake mechanism for arresting the movement of the drive wheel. These tortional stresses would be especially pronounced when the drive wheel is rotated or oscillated, so as to turn the motor vehicle within its own space. When the motor vehicle makes a sharp turn, the force exerted by the drive wheel is substantially parallel to the axis passing through the idle wheels, so as to cause the motor vehicle to pivot about a point intersecting the axis interconnecting the idle wheels. By applying the brakes to the idle wheels, this sideward pull of the drive wheel results in tremendous stresses in the body of the vehicle and very effectively overcomes the resistance of the brakes if the brakes were applied to the side wheels. The effectiveness of the brakes is further increased by being applied, as already stated, directly to the prime mover, which has been designed to rotate at a higher rate of speed than that of the drive wheel.

Referring to the drawings, the body 10 of the motor vehicle has a substantially oval contour, as viewed from the side. Near the forward end of the body is located a seat 12 provided with a back rest 14, so that passengers riding in the motor vehicle have an unobstructed view to the front and to the sides of the motor vehicle. This results in the motor vehicle being very well adapted as a sight-seeing chair or motor vehicle in amusement parks, fairs and elsewhere where such motor transportation is desirable.

For the convenience of the occupants of the chair or seat, a footboard 16 angularly disposed is mounted immediately in front of the seat. The footboard 16 is preferably protected by a suitable bumper 18 which projects ahead of the motor vehicle a sufficient distance so as to protect the occupants of the motor vehicle.

The forward end of the body or chassis 10 of the motor vehicle is supported upon a pair of front wheels 20, one on either side. These wheels are journalled upon suitable bearings fixedly mounted in place. The only purpose of these wheels is to support the forward end of the vehicle, in that a third rear wheel 22 is used for propelling the motor vehicle, for supporting the rear end, for applying the brakes and for steering or guiding the motor vehicle, as will appear more fully from the description of the driving and steering mechanism which follows.

Figure 2:
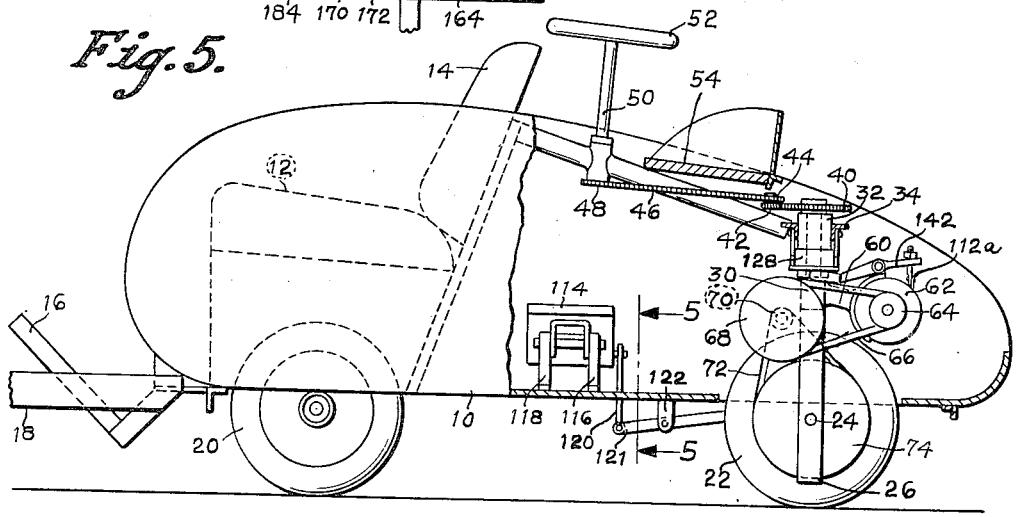
Figure 2 is a side elevation with part of the body broken away, so as to disclose portions of the driving mechanism.

The rear wheel 22 is rotatably mounted upon an axle or spindle 24 mounted in a forked member 26 and held in position by a plurality of nuts 28. Suitable bearings are used to rotatably support the wheel 22 upon the spindle 24. The upper end of the forked member 26 is attached to a suitable vertical shaft 30 mounted in a bearing 32 fixedly mounted in a pair of transverse members 34 fixedly attached to the body of the motor vehicle. As best seen in Figure 2, the upper end of the shaft 30 supports a gear 40 meshing with a pinion 42 fixed to a sprocket 44 actuated by a chain 46 having the forward end passed over a sprocket 48 fixedly attached to a steering shaft or column 50 supporting a steering wheel 52. The steering wheel 52 is mounted to the rear of the seat 12 and directly in front of a driver's seat or pilot's seat 54, so that the pilot's seat is mounted to the rear of the passenger seats and on a higher level. The chauffeur or driver is seated to the rear of the passengers, but on a higher level, so that the driver may have a clear view as to the course of the motor vehicle, but at the same time be so positioned as to be out of the normal range of vision of the passengers. Another advantage of this arrangement is the ease with which the driver may describe the views in the vicinity of the passengers. If the driver were to be positioned in front of the passengers, as is the chauffeur in conventional automobiles, it is rather difficult for the driver or guide to carry on a conversation with those in the rear seat. By the driver's seat being located to the rear and on a higher level than the passengers, the driver of the motor vehicle can carry on a conversation, explaining to the passengers the scenes without turning his head and without lifting his eyes from the road or path immediately ahead of the motor vehicle.

In changing the course of a motor vehicle utilizing the front wheels as steering wheels, the veering of the front wheels in one direction results in the veering of the motor vehicle in the same direction. When the rear wheel is used in steering a motor vehicle, the veering of the rear wheel in one direction results in the veering of the motor vehicle in the opposite direction. That being the case, instead of a direct connection from the steering column to the steering mechanism of the front wheels, as used in conventional automobiles, a reverse connection is desirable when a rear wheel drive is used. This permits the driver of the motor vehicle to veer the forward edge of the steering wheel in the direction it is desirable to veer the motor vehicle. By providing the pinion 42 meshing with the gear 40, this reversal of direction is produced. Due to the fact that the rear wheel is also used as a driving wheel, which will be described more fully later, it is possible to turn the steering wheel 22 so as to form substantially right angles with the longitudinal length of the motor vehicle, thereby causing the motor vehicle to turn around in substantially its own area. This is very desirable where the motor vehicle is used in carrying passengers in crowded areas.

In order to reverse or back the motor vehicle, it is merely necessary to rotate the shaft 30 through 180°, so as to reverse the wheel 22, which also propels the motor vehicle, as will be described more fully later.

The shaft 30, directly above the fork 26 supports a bracket 60 that normally extends rearwardly. The bracket 60 supports a prime mover, such as an electric motor 62, the armature shaft of which supports a pulley 64 over which passes a V-belt 66, extending over a pulley 68 fixedly attached so as to rotate in unison with a pulley 70 driving a belt 72 passing over a pulley 74, fixedly attached to the side of the drive wheel 22. Instead of the belt 72, a chain or any other type of driving mechanism could be used.

In order to properly tension the V-belt 66 and the belt 72, the pulleys 68 and 70 have been journalled upon a pintle mounted in an arm 80 pivotally supported upon a bracket 82 at 85. This bracket 82 is provided with a pair of upwardly directed portions 84 and 86, as best seen in Figure 3. These members 84 and 86 support a pair of oppositely disposed set screws 88 and 90 respectively, so that the V-belt 66 may be tensioned or loosened by adjusting the set screw 88 and 90, so as to shift member 88 to the left or to the right, as viewed in Figure 3. The bracket 82 is also pivotally mounted at 92 to one of the sides of the forked member 26. Bracket 82 may be adjusted by a set screw 94 mounted in an arm 96 extending outwardly from one of the forked members 26 and by a second set screw 98 engaging the upwardly directed portion 86 of the bracket 82. By adjusting set screws 94 and 98, the belt 72 may be properly tensioned.

The dimensions of the pulleys have been selected so as to produce a speed reducing mechanism for driving the rear wheel 22 from the prime mover 62. Any gear ratio may be selected to accomplish the desired results.

The motor 62 is energized from storage batteries not shown that are preferably mounted underneath the seat 12. One terminal of the storage battery is connected through a sliding contact 100 engaging a conductor 102 extending through the center of the shaft 30 so as to permit the lead not shown to extend from the lower end of the shaft 30 to one of the brushes of the motor. The other brush is preferably grounded to complete the circuit. The details of the electric circuit have not been shown, as this per se is not considered part of this invention excepting in so far as the closing of the circuit is concerned, which will be described more fully in connection with the brake mechanism.

From the foregoing description is can readily be seen that as the steering wheel is rotated, the shaft 30 rotates and with it the motor and the entire driving mechanism, so that the driving mechanism including the motor is mounted as a unit in association with the third or rear wheel. Whenever it is desired to change the course of the motor vehicle, the motor and the driving mechanism is rotated with the shaft 30 and with the steering wheel 22. This results in a considerable mass being concentrated directly above the driving wheel. In addition to this mass, the pilot's seat is located between the front wheels and the rear wheels, so that the weight of the driver is in part supported upon the third and driving wheel.

In the present embodiment the drive wheel has also been used as a brake wheel. The brakes are applied directly to the prime mover. This has been accomplished by mounting a brake drum 110 on the armature shaft opposite the pulley 64. A brake band 112 surrounding the brake drum 110 may be tightened by a brake applying mechanism, which will now be described. As may best be seen by referring to Figure 2, a treadle 114 is pivotally mounted upon a pair of brackets 116 and 118 fixedly attached to the floor of the body 10. This treadle 114 is mounted for oscillatory movement, so that when one end is lowered from neutral position, the circuit through the motor is closed and when the opposite end is lowered, the circuit through the motor is opened and the brake is applied.

The brake band 112 is tightened through a system of brake links and levers including a link 120 having one end pivotally mounted to the treadle 114 and the other end connected to a lever 121 pivotally mounted to a bracket 122. The opposite end of lever 121 is connected by a link 124 to a lever 126 provided with a bifurcated portion forming forks 126a and 126b, pivoted to the transverse members 34 and straddling a quill 128. This quill 128 is provided with a radially disposed collar portion 130 abutting a bifurcated end 134 of member 136 keyed to a shaft 138 journalled in a suitable bearing 140, supported upon a housing of the motor 62 and extending substantially parallel to the armature shaft. The opposite end of the shaft 138 supports an arm 142 supporting the end of the brake band 112 through a threaded portion 112a permitting tightening or loosening of the brake band 112. If the treadle 114 is rotated so as to raise the end of lever 120 pivotally attached thereto, the link 124 is pulled downwardly, thereby forcing the forked end 134 of member 136 downwardly, so as to rotate the shaft 138 in a counterclockwise direction, as viewed in Figure 2, thereby tightening the brake band 112 about the brake drum 110.

From the foregoing description it may readily be seen that the effectiveness of the force applied to the brake drum 110 is multiplied by the speed reducing mechanism including the relative sizes of the pulleys, so that a very small force applied to the brake drum 110 results in an extremely large force being applied to the wheel 22. In other words, the speed reducing mechanism is the equivalent of a lever having the fulcrum nearer the load than the point of application of the force. This is very desirable, in that an effective brake is essential in a motor vehicle that is used for the purpose for which the motor vehicle disclosed herein is to be used, in that the motor vehicle may be used for carrying passengers among pedestrians where the motor vehicle must be under the absolute control of the driver at all times. The arrangement of the treadle for closing the circuit when oscillating in one direction and for applying the brakes when oscillating in the opposite direction, results in a control mechanism for a motor vehicle whereby it is physically impossible to apply the brakes when the current is supplied to the motor. The application of the brakes automatically interrupts the circuit to the motor.

Figure 5:
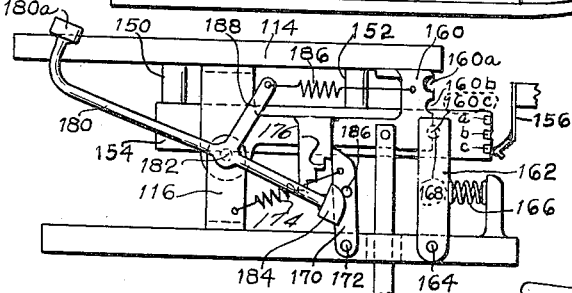
Figure 5 is a detail view of the control and brake treadle.

In Figure 2 the treadle has been shown mounted for free rotation, excepting the resistance offered by the brake mechanism and the switch mechanism. In Figure 5 a detailed locking or restraining mechanism has been shown for either locking or restraining the free movement of the treadle. The switch restraining mechanism, shown schematically, will be described first. This switch mechanism includes a plurality of groups of movable contacts a, b and c, supported upon a member 154 held in fixed spaced relation under the treadle 114 by a pair of spacers 150 and 152. These contacts a, b and c are preferably connected to the batteries, so as to supply various voltages to the motor through a stationary contact 156 slidingly engaging one group of contacts a, b or c. The treadle also supports a notched bracket 160 provided with a plurality of notches 160a, 160b and 160c, one for each of the contacts a, b and c.

A restraining member 162, pivotally mounted at 164 and urged in a counterclockwise direction by a spring 166, supports a roller or stud 168 adapted to be seated in one of the notches 160a, 160b or 160c when the fixed contact 156 is in engagement with the group of contacts a, b or c. The roller or pin 168 being urged in a counterclockwise direction, as viewed in Figure 5, restrains the free movement of the treadle 114 when one group of contacts is in engagement with the stationary contact 156. By rotating the treadle 114 in a clockwise direction, as viewed in Figure 5, the succeeding group of contacts is advanced into engagement with the stationary contact 158. This increases the speed of the motor, so as to increase the speed of the vehicle. In other words, the group of contacts a compares with high speed, contacts b with intermediate and contacts c with low speed. Whenever it is desirable to arrest the movement of the motor vehicle or slow speed, it is merely necessary to rotate the treadle in a counterclockwise direction, as viewed in Figure 5, so as to open the switch or the contacts in the electric circuit, at which time the treadle moves into neutral position. By continuing the rotation of the treadle 114 in a counterclockwise direction, the brakes are applied, as has already been described.

As the brakes are applied a pawl 170 pivotally mounted at 172 and biased in a counterclockwise direction by a spring 174, normally engages one of a series of notches or teeth in ratchet member 176 attached to the under side of the treadle. Thus, it is seen that as the brakes are applied, the brakes are automatically locked in position by the pawl 170 engaging the teeth in the ratchet 176. The pawl 170 may be released by a brake releasing lever or pedal 180 pivotally mounted at 182 and provided with a cam portion 184 engaging a pin 186 in the pawl 170, so that as the brake releasing lever 180 is rotated in a counterclockwise direction by the operator depressing the pedal portion 180a, the pawl 170 is moved out of engagement with the teeth of the ratchet member 176. The brake releasing lever 180 is normally urged in a clockwise direction by a suitable spring 186 connected to the end of an arm 188 integral with member 180.

If the operator desires to apply the brakes momentarily, without locking the brakes in position, it is merely necessary for the operator to step on the pedal 180a with one foot, so as to hold the pawl 170 out of engagement with the teeth on the ratchet 176, thereby permitting the brakes to be released immediately upon the release of the pressure exerted upon one end of the treadle 114.

Although the preferred embodiment shown herein discloses a motor vehicle especially adapted for sight-seeing use in parks, fairs, etcetera, this type of motor vehicle has merely been used for the purpose of illustration, as the principles incorporated in this motor vehicle are equally applicable to other motor vehicles, such as automobiles, trucks, motorized artillery, motorized machine guns, tractors, tricycles and the like, especially where a third rear wheel drive is utilized for steering and applying the brakes to the motor vehicle. Instead of a single rear wheel being used, a pair of rear wheels mounted for oscillation could be used for veering the motor vehicle.

Furthermore, for the convenience of explanation and a disclosure easily shown for the purpose of illustration, an electrically driven motor vehicle has been shown. Instead of an electric motor being used as a prime mover, any other type of a motor or engine could be used, such as a gasoline engine, alcohol engine, Diesel engine, steam engine, turbine engine or any other suitable source of power. In the event a fuel type engine is used, this engine could be controlled by means of a member actuated by suitable control mechanism, which member could extend through the center of the shaft 30 down to the engine, or said member could be concentrically disposed with respect to the shaft 30, so as to control the engine. "Prime mover," as used herein, is used as a generic term to any type of a motor, engine or source of energy that is adaptable for use in propelling the motor vehicle, irrespective of its make, type, construction, etcetera.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth as disclosed and defined in the appended claims.

Having thus described my invention, I claim:

1. A tri-wheel motor vehicle including a unitary chassis having a floor, a pair of idly mounted front wheels supporting the chassis, a rear driving and guiding wheel, supporting means mounted in the chassis for rotation about a substantially vertical axis, said means having rotatably mounted therein the rear driving and guiding wheel, a steering device for oscillating said means about the vertical axis so as to guide the motor vehicle, a prime mover mounted upon said means, a speed reducing mechanism for interconnecting the prime mover to the rear driving wheel, a brake drum fixedly attached to the prime mover, and a brake mechanism including a brake band adapted to contact said drum, a pivotally mounted actuating lever having one end attached to the brake band, the opposite end being bifurcated so as to form a pair of bifurcated portions straddling the vertical axis about which said guide wheel oscillates, a foot pedal mounted on the floor of the chassis, reciprocatory means surrounding said vertical axis and adapted to engage the bifurcated portions of said lever, and link mechanism for interconnecting the foot pedal to said reciprocatory means, so that as the foot pedal is actuated said reciprocatory means engages the bifurcated end of the lever to actuate the brake band to thereby control the brake mechanism.

2. A three wheel motor vehicle including a unitary chassis having a floor portion, a pair of idle wheels supporting the chassis, a third wheel, a support mounted in the chassis for rotation about a vertical axis in which support the third wheel is rotatably mounted, a steering wheel for rotating said support to thereby rotate the third wheel so as to guide the motor vehicle, a prime mover mounted upon said support, said prime mover having a brake drum, speed reducing means for interconnecting the prime mover to the third wheel, and a brake mechanism including a foot pedal mounted on the floor portion, a brake band adapted to contact said brake drum, and a link mechanism for interconnecting the foot pedal to the brake band, said link mechanism including a bifurcated lever having the bifurcated portions arranged to straddle the vertical axis of rotation of said support, and reciprocatory means surrounding the axis of rotation for engaging the bifurcated portions of said lever to thereby tighten the brake band against the brake drum in response to movement of the foot pedal.

3. In a three wheel motor vehicle, the combination including a unitary chassis, a support mounted in the chassis for rotation about a vertical axis, a drive and guide wheel mounted for rotation in said support, means mounted on the chassis for rotating said support to thereby shift the course of the drive wheel, so as to guide the motor vehicle, a prime mover mounted upon said support, a speed reducing mechanism for interconnecting the prime mover and the drive wheel, said prime mover rotating with the support, a brake drum connected to the prime mover, and a brake mechanism including a brake band adapted to contact the brake drum, a foot pedal mounted on the chassis, and means for interconnecting the foot pedal to the brake band so that as the foot pedal is actuated the brake band is tightened against the brake drum, said last mentioned means including a bifurcated lever having the bifurcated portions arranged in straddling relation with respect to the axis of rotation of the guide wheel in said support, and reciprocatory means straddling the axis of rotation contacting the bifurcated portions of the lever to transmit movement from the foot pedal to the brake band.

4. In a three wheel motor vehicle, the combination including a unitary chassis, a support mounted in the chassis for oscillatory movement about a substantially vertically disposed axis, said support including a shaft terminating in a bifurcated fork, a drive wheel mounted in the fork, a bracket supported upon the shaft, a prime mover mounted upon the bracket for rotation with the shaft, driving means for interconnecting the prime mover to the drive wheel, and a brake mechanism for arresting the movement of the drive wheel and thereby arresting the movement of the motor vehicle, said brake mechanism including a brake drum rotating with the drive mechanism, a brake band adapted to contact the brake drum, a foot pedal mounted on the chassis, and link mechanism for interconnecting the foot pedal to the brake band so that as the foot pedal is actuated the brake band is tightened against the brake drum, said link mechanism including means surrounding said shaft and having a reciprocatory movement in parallel relation thereto, said last mentioned means having a swivel connection for applying the brakes irrespective of the position of the drive wheel.

LEVITT L. CUSTER.